Jan. 5, 1926.
W. A. SCHATZ
1,568,091
DISPENSING DEVICE
Filed Dec. 13, 1921
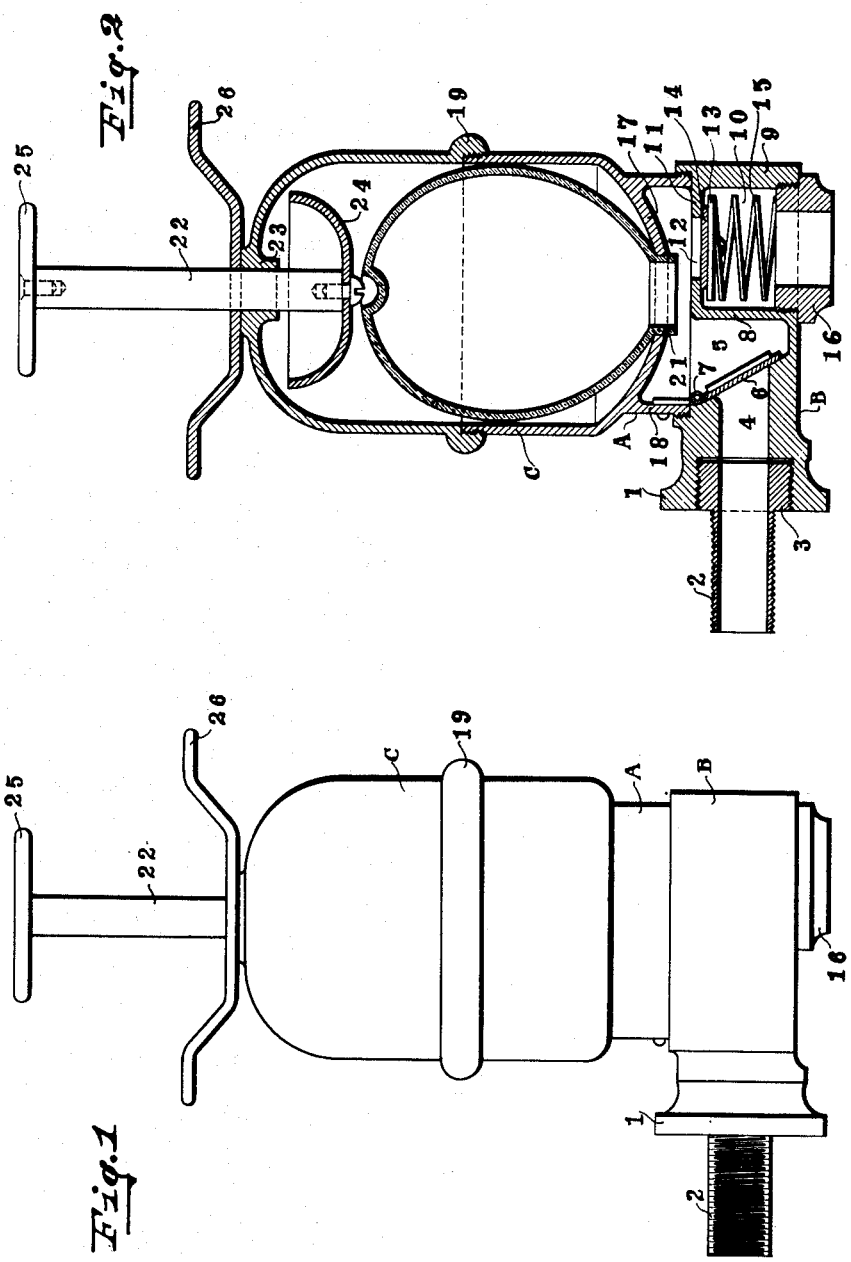
INVENTOR
William A. Schatz
BY
Duell, Warfield & Duell
ATTORNEY Patented Jan. 5, 1926.

1,568,091

UNITED STATES PATENT OFFICE

WILLIAM A. SCHATZ, OF ASTORIA, NEW YORK, ASSIGNOR OF SEVENTY PER CENT TO WILLIAM J. ATWOOD, OF NEW YORK, N. Y.

DISPENSING DEVICE.

Application filed December 13, 1921. Serial No. 522,092.

*To all whom it may concern:*

Be it known that I, WILLIAM A. SCHATZ, a citizen of the United States, residing at Astoria, in the county of Queens and State of New York, have invented certain new and useful Improvements in Dispensing Devices, of which the following is a full, clear, and exact description, such as will enable others skilled in the art to which it appertains to make and use the same.

This invention relates to dispensing devices, and more particularly in some of its details to hand operated liquid dispensing devices.

The invention has for its general object to improve and perfect dispensing devices of the class mentioned.

Another and more specific object is to provide an improved dispensing device of the class mentioned which is particularly adapted to keep the dispensed liquid from external air, or from contact with other undesirable or unsanitary agencies.

Still another object is to provide an improved dispensing device of the class mentioned, operating simply and effectively to measure liquid in pre-determined amounts as required for consumption.

Another object is to provide an improved hand operated liquid dispensing device of simple and rugged construction, little subject to wear or deterioration under ordinary service conditions, and which is inexpensive in production cost and reliable and efficient in use.

Other objects will be in part obvious in connection with the following detailed description, and part pointed out in connection therewith.

The invention accordingly consists in the features of construction, combinations of elements and arrangement of parts which will be exemplified in the construction hereinafter set forth, and the scope of their application will appear in the appended claims.

In the accompanying drawing wherein an illustrative but preferred embodiment of the invention is shown, Figure 1 is a side elevation of a dispensing device embodying this invention, and Fig. 2 is a vertical central sectional view thereof.

Referring now to the drawing for a detailed description of the embodiment therein illustrated, a dispensing device is shown comprising a casing A including the structural and operative elements of the dispenser, and being substantially made up of a base section B and a second section C separably attached to the base section and forming a barrel in which the measuring element is formed or housed.

The base section is made up of any desired configuration for attractive or ornamental appearance, and is preferably approximately circular in horizontal projection and provided at one side with a boss or projection 1 and a threaded nipple 2 extending therefrom for attaching the device to a vessel for containing the liquid to be dispensed. The nipple is provided with an enlarged threaded terminal portion 3 adapted to be screwed into a correspondingly threaded socket in the base 1. This arrangement provides a convenient means for replacing the nipple in case the same becomes damaged or where it is desired to employ a thread of different style or pitch. A suitable packing washer may be placed between the inner end of the nipple and the bottom of the threaded socket forming a liquid-tight joint at this point, and a packing washer may also be placed around the nipple adjacent the face of the boss so as to provide a liquid-tight joint between the dispenser and the liquid containing vessel.

The base section is provided with an induction opening or conduit 4 extending through the boss 1, forming a continuation of a registering opening through the nipple 2, and leading at its inner end into a valve box or chamber 5. An automatically opening and closing valve 6 suitably weighted, is arranged at the inner extremity of the induction conduit and is flexibly secured as at 7 to the inner wall of the valve box for pivotal movement. This valve is arranged to seat against a circular shoulder surrounding the opening to form a liquid-tight joint when in closed position.

Positioned in the valve box opposite the induction opening is a wall 8 preferably integral with the base, lying in the arc of a circle and merging at its outer side with a wall portion 9 of the base. This wall provides an eduction conduit or opening 10 having an upper wall 11 provided with a central opening 12, for the outward passage of the dispensed liquid. An automatically opening and closing eduction valve 13 is seated against the lower sides of wall 11, a packing gasket 14 being interposed for making a liquid-tight joint. A coil spring 15 is attached to the lower side of the valve 13 and seated at its lower end on a block 16 is threaded into the lower edges of wall 8. The position of this block may be varied so as to adjust the tension of spring 15, but in practice a spring of proper strength will be chosen so the valve will function properly when the block is screwed firmly into seating position in the lower end of the eduction opening. The block 16 is provided with a central opening registering with the eduction opening and may be suitably shaped to form a dispensing nozzle.

The barrel section C of the casing is somewhat elongated, and circular in cross-section, being provided at its lower end with a smoothly curved downwardly bulging wall 17, presenting a concave interior surface. A circular wall or flange 18 integral with the wall 17 extends downwardly from the latter, being exteriorly threaded at its lower edge so as to be screwed into an interiorly threaded socket formed in the upper surface of the base section adjacent the valve box. The barrel section is preferably made in two parts threaded together so as to form a tight joint. As shown, one part of the barrel is provided with a circular rib 19, interiorly threaded for receiving the threaded edge of the other part and forming a smooth external bead which is ornamental in appearance. This provides a means for securing the two parts of the barrel firmly together, while at the same time allowing ready separation thereof for permitting access to the interior of the barrel.

Freely seated within the barrel on the lower concave surface thereof is a resilient contractible and expansible bag 20, preferably of rubber, and being imperforate except for an opening in a neck 21 at its lower end extending into the valve chamber through an opening in the wall 17. A plunger 22 is slidably mounted in a guide 23 formed integrally with the upper head of the barrel. To the lower end of this plunger is secured a contact member 24 presenting a smoothly curved lower contact surface for engaging the upper part of the resilient bag for contracting or collapsing the same when the plunger is forced downwardly. To the upper end of the plunger is secured a hand piece 25, and an operating bar or rest 26 is secured to the upper end of the barrel adjacent the plunger and is adapted to be grasped by or to contact with the hand of the operator to brace and steady the same while another portion of the operator's hand forces the plunger downwardly. The device just described provides a manually actuated liquid motor having a chamber for receiving the liquid in predetermined quantities, and being operable to draw the liquid into the chamber and to subsequently expel the same through the eduction valve and nozzle 16.

The operation of the device, which will be largely apparent from the foregoing detailed description, is briefly as follows: The resilient contractible and expansible bag having previously been filled with liquid from the container, is collapsed by downward movement of the plunger, the smoothly curved terminal portion 24 contacting with the upper surface of the bag which folds evenly and smoothly around the terminal so as to prevent creasing, cracking, or other injury to the bag. This movement forces liquid from the bag through the open neck 21 into the valve chamber 5, the pressure exerted forcing the valve 13 into open position and forcing the liquid outwardly through the eduction opening and nozzle into a suitable container held therebeneath. During this downward movement of the plunger the valve 6 is held firmly seated so as to effectually close the induction opening to passage of liquid thereto from the valve chamber. Upon release of pressure upon the plunger the bag expands under its own resiliency, forcing the plunger upwardly, and the liquid will then flow through the induction opening due to the partial vacuum created in the bag forcing the valve 6 into open position and filling the bag with a fresh charge. During this expanding movement the valve 13 is firmly seated by operation of the spring 15 to close the eduction opening, cutting off all flow of liquid from the valve chamber to the nozzle and preventing dripping from the latter.

By the arrangement described the liquid in the dispensing device is kept from contact with air or unsanitary agencies.

Should it be desirable to dispense liquid in different quantities, this may be readily accomplished by substituting plungers of different lengths, the quantity dispensed being substantially proportional to the stroke of the plunger, and the stroke may of course be varied by varying the length thereof. The device is always ready to dispense a predetermined quantity of the liquid and is automatically charged with a pre-determined quantity at the end of each dispensing stroke. In case the bag becomes damaged or it is desirable to replace the same by one of a different size, this may be readily accomplished by unscrewing the two parts of the barrel section. This separable arrangement of barrel construction is also convenient for cleansing purposes. The valves also are readily accessible from the exterior for adjustment, repair or cleaning by unscrewing the barrel section from the base section.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. A dispensing device, including, in combination, a casing formed with a pair of chambers, a receptacle including a body of resilient material and a mouth disposed within one of said chambers and having its mouth in connection with the second of the same, means for collapsing said receptacle, the second chamber of said casing being formed with intake and outlet openings, and valves independent of said receptacle for controlling the flow of fluid through said latter openings.

2. A dispensing device, including, in combination, a receptacle having an imperforate body incorporating resiliency normally tending to maintain the same in extended condition, manually-operated means adapted to collapse said body, said body being formed with a mouth, means providing passages in communication with said mouth, and means independent of said receptacle for controlling the flow of fluid through said passages and mouth.

In testimony whereof I affix my signature.

WILLIAM A. SCHATZ.